United States Patent [19]

Fukasawa

[11] Patent Number: 5,767,172
[45] Date of Patent: Jun. 16, 1998

[54] WATER BASE INK COMPOSITION DIRECTLY FED TO A PEN BODY OF A BALL-POINT PEN

[75] Inventor: Teruaki Fukasawa, Isezaki, Japan

[73] Assignee: Kabushiki Kaisha Pilot, Tokyo, Japan

[21] Appl. No.: 659,736

[22] Filed: Jun. 6, 1996

Related U.S. Application Data

[63] Continuation-in-part of Ser. No. 095,372, Jul. 23, 1993, abandoned.

[30] Foreign Application Priority Data

Aug. 13, 1992 [JP] Japan .................................. 4-257093

[51] Int. Cl.$^6$ ........................................... C09D 11/18
[52] U.S. Cl. ........................ 523/161; 523/160; 524/127; 524/376; 524/377; 260/DIG. 38
[58] Field of Search ............................. 523/160, 161; 524/127, 376, 377; 106/20 R; 260/DIG. 38; 401/208, 209

[56] References Cited

U.S. PATENT DOCUMENTS

| | | | |
|---|---|---|---|
| 3,687,887 | 8/1972 | Zabiak | 524/96 |
| 4,136,076 | 1/1979 | Daniels | 524/96 |
| 4,154,618 | 5/1979 | Burke | 106/27 B |
| 4,567,213 | 1/1986 | Bhatia et al. | 523/160 |
| 4,711,802 | 12/1987 | Tannenbaum | 428/207 |
| 5,281,261 | 1/1994 | Lin | 106/20 R |

FOREIGN PATENT DOCUMENTS 1199004  7/1970  United Kingdom.

*Primary Examiner*—Vasu Jagannathan
*Assistant Examiner*—John J. Guarriello
*Attorney, Agent, or Firm*—Beveridge, DeGrandi, Weilacher & Young, L.L.P.

[57] ABSTRACT

Water base ink compositions for directly filling in a ball-point pen comprising a dyestuff in the range of 3% to 10% by weight; a humectant in the range of 10% to 40% by weight; thixotropic agent in the range of 0.6% to 1.0% by weight, being composed of a cross-linkable acrylic acid polymer having a molecular weight ranging from 2,000,000 to 6,000,000; and water as a balance the water base ink compositions have no spinnability, tackiness tendency and possibility of drippings and runnings from a pen-point, and can be directly filled into a ball-point pen.

14 Claims, No Drawings

WATER BASE INK COMPOSITION DIRECTLY FED TO A PEN BODY OF A BALL-POINT PEN

This application is a continuation-in-part of application Ser. No. 08/095,372, filed Jul. 23, 1993, now abandoned, which application is entirely incorporated herein by reference.

BACKGROUND OF THE INVENTION

This invention relates to water base ink compositions for a ball-point pen. More particularly, this invention relates to water base ink compositions for filling in a reservoir tube and directly feeding to a pen body without using an absorbent ink reservoir and an ink feed rod.

A conventional ball-point pen for water base inks has an absorbent ink reservoir or fibrous reservoir. The ink composition containing a pigment as the colorant and having an ink viscosity of 3 to 5 mPa·s is fed to a pen body from the ink reservoir through an ink feed rod. The absorbent ink reservoir and the ink feed rod are typical features of such ball-point pens as disclosed in, for example, Japanese Patent Laid Open (Kokai) No. 82120/1976, Japanese Patent Publication (Kokoku) No. 688/1979, Japanese Patent Publication No. 37571/1975, Japanese Utility Model Laid Open No. 17184/1983, Japanese Patent Laid Open No. 56528/1979, Japanese Patent Laid Open No. 146796/1980, and Japanese Utility Model Publication No. 35585/1991. This ink feeding method is advantageous in that good ink holding property is provided and thus any one of adequate ink compositions can be used without precise physical properties as an ink. However, it has disadvantages in that the pen body is supplied with less ink as the total amount of ink is reduced during use, thereby causing undesirable variation in thickness of written results. Also, it is difficult to know the amount of ink left in the pen; and the ink holding capacity is small.

It has been proposed to use ink compositions having thixotropic properties rather than using the absorbent ink reservoir. Such ink compositions are disclosed in, for example, Japanese Utility Model Publication No. 233/1986, Japanese Utility Model Publication No. 26077/1986, and Japanese Utility Model Publication No. 23785/1987.

These ink compositions are, however, not satisfactory because of low stability of the ink composition over time, possibility of component precipitation in the composition, ink clogging and crusting trouble due to low resistance to drying up, dripping and running of the ink composition from the pen point of a pen during writing.

SUMMARY OF THE INVENTION

An object of the present invention is to provide improved ink compositions as a result of determining the cause of these problems and how to solve them. The ink compositions according to the present invention can be directly filled into a pen body without using an absorbent ink reservoir and an ink feed rod. Such direct filling results in the increased ink holding capacity of a ball-point pen. In addition, this ink composition has high time-stability, high dry-up resistance and good ink release properties while having no spinnability, tackiness tendency and possibilities of dripping. Good ink release properties may reduce undesired wear of the pen body.

In achieving the above and other objects, the present invention provides water base ink compositions directly fed to a pen body of a ball-point pen comprising a dyestuff in the range of 3% to 10% by weight; a humectant in the range of 10% to 40% by weight; a thixotropic agent in the range of 0.6% to 1.0% by weight, the thixotropic agent being composed of a cross-linkable acrylic acid polymer having a number average molecular weight ranging from 2,000,000 to 6,000,000; and the balance, water.

Optionally, an anti-drip agent in the range of 0.3% to 0.5%, by weight can be added to the water base ink compositions of this invention.

Also, an anti-corrosive lubricant in the range of 0.2% to 2%, by weight can be added as an optional component.

Examples of other optional ingredient are: water-proofing agents in the range of 0.5% to 5%, by weight; pH modifiers in the range of 1% to 6%, by weight; and bacteriostats in the range of 1% to 2%, by weight.

Any suitable lubricant can be used for the water base ink compositions directly fed to a pen body of a ball-point pen as set forth herein. Examples include dihydric alcohols, trihydric alcohols and ether derivatives thereof preferably ethylene glycol and polyethylene glycol.

The anti-drip agent used for purpose of the invention is a water-soluble resin having film-forming properties, preferably a copolymer of polyethylene and polyethylene glycol.

As suitable anti-corrosive lubricants there may be mentioned phosphate surfactants, benzotriazole and fatty acid esters.

Many suitable water purifying agents can be incorporated in the water base ink compositions of the invention such as polyethyleneimine, polyethyleneimine derivatives, polyallylamine and polyallylamine derivatives.

The preferred pH modifier for this invention is triethanolamine.

The improved water base ink compositions of the invention have a metal ion concentration of equal to or less than 0.45%.

Ball-point pens can generally be classified into two types, i.e., a cap type ball-point pen having a cap and a cap-less type ball-point pen using no cap. A cap type ball-point pen may be carried with its pen point not being lowered. On the other hand, the pen point of the cap-less type ball-point pen is lowered when the pen is held with a clip. Thus, the problem of ink dripping is not always equivalent for both types of ball-point pens. More particularly, it is not necessary to include an anti-drip agent in the ink composition for the cap type ball-point pen. It is, of course, possible to included an anti-drip agent. Of these ink compositions according to the present invention, some containing no anti-drip agent are suitable as the ink composition for the cap type ball-point pen while others containing anti-drip agents provide a remarkable effect as the ink composition for the cap-less type ball-point pen.

It has been found, that a serious problem in the prior art is caused by the material used to provide thixotropic properties. This means that the ordinary thixotropic agents are not suitable for ink compositions. In addition, it was determined that a colorant also introduces a problem. Pigments have no ability to be redissolved, so that it is difficult to achieve high time-stability of its dispersions. Ink compositions containing a pigment are thus degraded in functions, as compared with those ink containing dyes. Further, pigments create a defect causing wear of the rolling ball located at a pen point, reducing writing life of a pen.

PREFERRED EMBODIMENT OF THE INVENTION

A first feature of the present invention is to use a crosslinkable acrylic acid polymer as the thixotropic agent.

The thixotropy is the property of highly viscous gels where weak hydrogen bonding is formed between compounds of components in an aqueous composition. The gel liquifies when subjected to agitation or vibration to break the hydrogen bonding.

Thus, the thixotropic viscous water base ink composition for a ball-point pen is a gel at rest, i.e., at a condition not being used, so that the ink composition will resist dripping, from the pen point of a ball-point pen even if it has no absorbent ink reservoir. The viscous ink composition becomes a thin liquid under the shearing action of the pen's revolving ball-point. As a result, the ink composition having low viscosity is fed to the pen point.

Aqueous compositions can exhibit the thixotropic properties when containing such materials as water soluble resin, gum, as well as inorganic powders such as aluminum hydroxide powder and bentonite.

However, blending of these materials will not result in sufficiently improved ink properties. More particularly, there are problems that the stability of ink composition is degraded, tackiness tendency occurs, and plastic fluidity is not obtained. For these reasons, the above mentioned materials are unsuitable as additives for ink compositions.

In contrast, it has been found that the cross-linkable acrylic acid polymers are superior to impart improved time-stability to the ink composition and to obtain adequate plastic fluidity properties and to avoid potential spinnability and the tackiness tendency.

The cross-linkable acrylic acid polymers suitable for the present invention are a type of crosslinkable polymer where the acrylic polymers having branching and are cross-linked at sites other than the carboxyl group.

According to various experimental results, it has been determined to use the cross-linkable acrylic acid polymer having a number average molecular weight of not less than 1,700,000 and preferably not less than 2,000,000. The polymer having the molecular weight of larger than 6,000,000 can only be dissolved with resulting turbidity, so that the suitable polymer has the molecular weight ranging from 2,000,000 to 6,000,000. The molecular weight of less than 1,700,000 will cause uneven release of the ink on writing.

The proportion of the cross-linkable acrylic acid polymer in the ink composition is described herein below. Uneven release of the ink composition from the pen or blurred writing are apt to be caused by the water base ink composition having viscosity of larger than 100 mPa·s, under the action of the pen's revolving ball-point. On the other hand, the absorbent ink reservoir can exhibit good ink holding properties only when the ink composition has the viscosity of more than 1,000 mPa·s at rest.

The proportion of the cross-linkable acrylic acid polymer in the ink composition depends on the molecular weight of the polymer used and other additives or ingredients. However, with respect to the viscosity of the ink composition, approximately 0.6%, by weight, should be added to the composition. Preferable results can be obtained with the proportion ranging from 0.6% to 1%, by weight.

A second feature of the present invention is to use dyes as the colorant. Dyes are water-soluble and capable of improving the stability of the ink composition when being added thereinto. In addition, dyes will not cause undesirable wear of the ball located at the pen point and will not cause clogging or crusting at the pen point. Of course, color tone is also satisfactory.

The dye amount in ink is preferably 3% to 10%, by weight (see Examples 32 and 33 of Table 2 below). When the amount is less than 3%, the amount of metal ion in the ink is smaller and thixotropic property may become better. However, the ink tends to become thinner, and writing ability tend to be degraded. Further, a longer time tends to be needed for dry-up of the film forming at the pen tip, and then the film formed tends not to be strong enough to reduce dripping. See Comparative Example 13 in Table 3 below.

When the dye amount in ink exceeds 10%, by weight, the amount of metal ion in the ink is larger and the thixotropic property is degraded. Drying up and dripping property becomes relatively better because the film forming at the pen tip is relatively quick. However, the resistance to drying up is lowered and time stability of the ink is also lowered because of dye solubility. See Comparative Example 14 in Table 3 below.

The dyes for good results contain few metal ions and have smaller dissociation factors than the cross-linkable acrylic acid polymer used to avoid influence of the dye on the thickening mechanism of the cross-linkable acrylic acid polymer. The metal ion concentration in the ink composition is preferably equal to or less than 0.45%. See Comparative Examples 10 to 12

When the metal concentration in the ink composition is lower than 0.45%, the thixotropic property becomes remarkably better. Then the viscosity designing becomes very easy and even ideal so as to make the viscosity high when a pen is used for writing and to make the viscosity low when a pen is not used for writing. In addition, the anti-dripping property and writing property are enhanced. Further, drying up and time stability property of the ink are excellent, because the amount of cross-linkable acrylic acid polymers to be added can be small. See Tables 1 to 3.

It is considered that the thickening mechanism of the cross-linkable acrylic acid polymer occurs due to repulsion of the $COO^-$ ion of the acrylic acid. Accordingly, it is preferable for obtaining the thixotropic ink composition to use dyes having less metal ion represented by $Na^+$ that inhibit the repelling action, as well as having structure that hardly affects on the $COO^-$ ion.

The present invention employs anion dyes. Suitable dyes are acid dyes and direct dyes. Suitable example of dyes used are as follows:

Direct Black 19, Direct Black 154, Direct Blue 3, Acid Blue 90, Acid Red 92, Acid Red 94, and Acid Orange 56. These and other suitable dyes are well known in the art.

A third feature of the present invention is to use an anti-drip agent.

Suitable anti-drip agents include water-soluble resins having film-forming properties, especially copolymers of polyethylene and polyethylene glycol. Such copolymers serve, in cooperation with the cross-linkable acrylic acid polymer, as a sealing agent that prevents flow of the ink composition when being exposed to the air at the pen point, thereby preventing dripping and running of the ink composition from the pen point of the pen.

The proportion of the anti-drip agent in the composition ranges from 0.3% to 0.5% by weight.

Denaturation of the ink composition at the pen point is generally considered to be unfavorable. This is because the pigments are used as the colorant and became it is impossible to release the ink on a paper when such denaturation occurs. The present invention uses dyes as the colorant, which means that, even though flowability of the ink composition is lost at the pen point, fresh ink is fed, upon use of the pen, to the pen point under revolving action of the ball-point and the water-soluble dyes are re-dissolved in water, enabling release of the ink composition. As compared to this, no pigments will be dispersed in water as the ink compositions after changing from the liquid state and losing its flowablity.

Exemplified anti-drip agents are as follows:

Polyethylene-polyethylene glycol copolymer, polyvinyl pyrrolidone, polyvinyl alcohol, propylene glycol alginate ester, cellulose ether, acrylic ester. The anti-drip agents according to the present invention may be selected from the group consisting of the above-mentioned compounds.

A fourth feature of the present invention is to use water-proofing agents selected from the group consisting of polyethyleneimine, polyethyleneimine derivatives, polyallylamine and polyallylamine derivatives. These compounds react with the surface of paper to provide sufficient water resistance to the released ink. The water proofing agent may be contained in the ink composition in the range of 0.5% to 5% by weight.

With humectant, it is possible to prevent the ink compositions from being evaporated and, in turn, to prevent dry-up thereof at the pen point.

The humectant may be selected from the group consisting of ethylene glycol, propylene glycol, glycerin, diethylene glycol, triethylene glycol, dipropylene glycol, thiodiglycol, polyglycerin, polyethylene glycol, polypropylene glycol, ethylene glycol monomethyl ether (trade name: METHYL CELLOSOLVE), ethylene glycol monobutyl ether (trade name: SUTYL CELLOSOLVE), diethylene glycol monomethyl ether (trade name: METHYL CARBITOL), and diethylene glycol ethyl ether (trade name: ETHYL CARBITOL). The ink composition preferably contains the humectant in the range of 10% to 40%, by weight.

When the amount of the humectant exceeds 40%, cross-linkable acrylic acid polymers tend to show less sufficient thixotropic property in the condition of relatively low water content, because the cross-linkable acrylic polymers swell with water and increase viscosity. See Comparative Example 15.

The anti-corrosive lubricant may be phosphate surfactants, benzotriazole and fatty acid esters. A pen body of a ball-point pen including water base ink compositions comprises a metal ball and a holder. The metal ball tends to rust away due to the water in the composition. If rusting starts, smooth operation of the ball will be badly affected. It is extremely preferable to contain the anticorrosive lubricant in the ink composition to provide smooth rotation of the ball, as well as to prevent rusting thereof. The anti-corrosive lubricant ranges from 0.2% to 2%, by weight.

Besides, triethanolamine addition of 1% to 6%, by weight, as the pH modifier results in improved stability of the ink composition.

Further the bacteriostat such as 1,2-benziothiazole-3(2H)-one may be added to the ink composition depend on necessary.

EXAMPLES

The foregoing features of the present invention will be more readily apparent in the context of a specifically delineated set of examples.

Example 1

An ink composition was prepared by dispersing the indicated proportions of ingredients as follows:

| | |
|---|---|
| Direct Black 154 | 7.5 wt. % |
| Cross-linkable acrylic acid C | 0.6 wt. % |
| Ethylene Glycol | 20.0 wt. % |
| pH Modifier | 1.0 wt. % |
| Anti-corrosive Lubricant | 0.2 wt. % |
| Bacteriostat | 1.0 wt. % |
| Ion Exchanger | (Remainder) |

The properties of this ink composition are set forth in Table 1.

TABLE 1

| | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Direct Black 154 Metal Ion ≦ 1.0% | 7.5 | 7.5 | 7.5 | 7.5 | 7.5 | 7.5 | 7.5 | 7.5 | 7.5 | 7.5 | 7.5 | 7.5 | 7.5 | 7.5 |
| Acid Red 94 Metal Ion ≦ 5.5% | | | | | | | | | | | | | | |
| Acid Blue 90 Metal Ion ≦ 6.0% | | | | | | | | | | | | | | |
| Cross-linkable Acrylic Acid A | | | | 0.7 | | | | | | | | | | |
| Cross-linkable Acrylic Acid B | | | | | 0.7 | | | | | | | | | |
| Cross-linkable Acrylic Acid C | 0.6 | 0.7 | 0.8 | | | | | 0.6 | 0.7 | 0.8 | 0.7 | 0.7 | 0.7 | 0.7 |
| Cross-linkable Acrylic Acid D | | | | | | 0.7 | | | | | | | | |
| Cross-linkable Acrylic Acid E | | | | | | | 0.7 | | | | | | | |
| Ethylene | 20.0 | 20.0 | 20.0 | 20.0 | 20.0 | 20.0 | 20.0 | 10.0 | 10.0 | 10.0 | 10.0 | 20.0 | 20.0 | 20.0 |

TABLE 1-continued

| | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Glycol Propylene Glycol | | | | | | | | 10.0 | 10.0 | 10.0 | | | | |
| Glycerin | | | | | | | | | | | 10.0 | | | |
| Anti-sag Agent | | | | | | | | | | | | 0.5 | | 0.5 |
| Water-proofing Agent | | | | | | | | | | | | | 1.0 | 1.0 |
| pH Modifier | 1.0 | 1.0 | 1.0 | 1.0 | 1.0 | 1.0 | 1.0 | 1.0 | 1.0 | 1.0 | 1.0 | 1.0 | 1.0 | 1.0 |
| Anti-corrosive Lubricant | 0.2 | 0.2 | 0.2 | 0.2 | 0.2 | 0.2 | 0.2 | 0.2 | 0.2 | 0.2 | 0.2 | 0.2 | 0.2 | 0.2 |
| Bacteriostat | 1.0 | 1.0 | 1.0 | 1.0 | 1.0 | 1.0 | 1.0 | 1.0 | 1.0 | 1.0 | 2.0 | 1.0 | 1.0 | 1.0 |
| Ion Exchange Water | Rest | Rest | Rest | Rest | Rest | Rest | Rest | Rest | Rest | Rest | Rest | Rest | Rest | Rest |
| Metal Ion Density in Ink (%) | ≦0.075 | ≦0.075 | ≦0.075 | ≦0.075 | ≦0.075 | ≦0.075 | ≦0.075 | ≦0.075 | ≦0.075 | ≦0.075 | ≦0.075 | ≦0.075 | ≦0.075 | ≦0.075 |
| Thixotropic properties | ○ | ○ | ○ | Δ | ○ | ○ | ○ | ○ | ○ | ○ | ○ | ○ | ○ | ○ |
| Sags and Runs | Δ | Δ/⊙ | Δ | Δ | Δ | Δ/⊙ | Δ/⊙ | Δ | Δ/⊙ | Δ | Δ/⊙ | ⊙ | Δ/⊙ | ⊙ |
| Ink Release Properties | ○ | ⊙ | ○ | Δ | ○ | ⊙ | ⊙ | ○ | ⊙ | ○ | ⊙ | ⊙ | ⊙ | ⊙ |
| Dry-up Resistance | ⊙ | ⊙ | ⊙ | ⊙ | ⊙ | ⊙ | ⊙ | Δ | Δ | Δ | Δ | ⊙ | ⊙ | ⊙ |
| Water Resistance | x | x | x | x | x | x | x | x | x | x | x | x | ○ | ○ |
| Ink Properties with Time | ○ | ○ | ○ | ○ | ○ | ○ | ○ | ○ | ○ | ○ | ○ | ○ | ○ | ○ |

(Note)
Cross-linkable acrylic acid A 1,700,000
Cross-linkable acrylic acid B 2,000,000
Cross-linkable acrylic acid C 3,000,000
Cross-linkable acrylic acid D 4,000,000
Cross-linkable acrylic acid E 6,000,000
Cross-linkable acrylic acid F 1,500,000
Cross-linkable acrylic acid G 7,000,000
Cross-linkable acrylic acid:
HIVIS WAKO ® (Wako Pure Chemical Industries, Ltd.)
JUNLON (Japan Pure Chemical Co., Ltd.)
RHBOGIC ® (Japan Pure Chemical Co., Ltd.)
CARBO BALL (B. F. Goodrich Company)

Symbols in Table 1 are denoted as: ⊕:Very good; ○:Good; Δ:Satisfactory; x:Not satisfactory This note is also applicable;

Examples 2 through 14

The ink compositions were prepared in the same manner as described in Example 1 other than the proportions of ingredients being set forth in Table 1.

Examples 15 through 33

The ink compositions were prepared in the same manner as described in Example 1 other than the proportions of ingredients being set forth in Table 2.

TABLE 2

| | Examples | | | | | | | | | |
|---|---|---|---|---|---|---|---|---|---|---|
| | 15 | 16 | 17 | 18 | 19 | 20 | 21 | 22 | 23 | 24 |
| Direct Black 154 Metal Ion ≦ 1.0% | 7.5 | | | | | | | | | |
| Acid Red 94 Metal Ion ≦ 5.5% | | 8.0 | 8.0 | 8.0 | 8.0 | 8.0 | 8.0 | | | |
| Acid Blue 90 Metal Ion ≦ 6.0% | | | | | | | | 7.0 | 7.0 | 7.0 |
| Cross-linkable Acrylic Acid A | | | | | | | | | | |
| Cross-linkable Acrylic Acid B | | | | | | | | | | |
| Cross-linkable Acrylic Acid C | 0.7 | 0.8 | 0.9 | 1.0 | 0.9 | 0.9 | 0.9 | 0.6 | 0.8 | 0.9 |
| Cross-linkable Acrylic Acid D | | | | | | | | | | |
| Cross-linkable Acrylic Acid E | | | | | | | | | | |
| Ethylene Glycol | 10.0 | 20.0 | 20.0 | 20.0 | 10.0 | 30.0 | 20.0 | 20.0 | 20.0 | 20.0 |
| Propylene Glycol | | | | | | | | | | |
| Glycerin | 10.0 | | | | | | | | | |

TABLE 2-continued

| | | | | | | | | | | |
|---|---|---|---|---|---|---|---|---|---|---|
| Anti-sag Agent | 0.5 | | | | | 0.5 | | | | |
| Water-proofing Agent | | | | | | | | | | |
| pH Modifier | 1.0 | 6.0 | 6.0 | 6.0 | 6.0 | 6.0 | 6.0 | 4.0 | 4.0 | 4.0 |
| Anti-corrosive Lubricant | 0.2 | 1.0 | 1.0 | 1.0 | 1.0 | 1.0 | 1.0 | 0.5 | 0.5 | 0.5 |
| Bacteriostat | 2.0 | 1.0 | 1.0 | 1.0 | 1.0 | 1.0 | 1.0 | 1.0 | 1.0 | 1.0 |
| Ion Exchange Water | Rest | Rest | Rest | Rest | Rest | Rest | Rest | Rest | Rest | Rest |
| Metal Ion Density in Ink (%) | ≦0.075 | ≦0.44 | ≦0.44 | ≦0.44 | ≦0.44 | ≦0.44 | ≦0.44 | ≦0.42 | ≦0.42 | ≦0.42 |
| Thixotropic properties | ○ | ○ | ○ | ○ | ○ | ○ | ○ | ○ | ○ | ○ |
| Sags and Runs | ○ | Δ | Δ | Δ | Δ | Δ | ○ | Δ | Δ | Δ |
| Ink Release Properties | ⊙ | ○ | ⊙ | ○ | ⊙ | ⊙ | ○ | ○ | ⊙ | ○ |
| Dry-up Resistance | Δ | ⊙ | ⊙ | ⊙ | Δ | ⊙ | ⊙ | ⊙ | ⊙ | ⊙ |
| Water Resistance | x | x | x | x | x | x | x | x | x | x |
| Ink Properties with Time | ○ | ○ | ○ | ○ | ○ | ○ | ○ | ○ | ○ | ○ |

| | Examples | | | | | | | | |
|---|---|---|---|---|---|---|---|---|---|
| | 25 | 26 | 27 | 28 | 29 | 30 | 31 | 32 | 33 |
| Direct Black 154 Metal Ion ≦ 1.0% | | | | | 7.5 | | | 3.0 | 10.0 |
| Acid Red 94 Metal Ion ≦ 5.5% | | | | | | 8.0 | | | |
| Acid Blue 90 Metal Ion ≦ 6.0% | 7.0 | 7.0 | 7.0 | 7.0 | | | 7.0 | | |
| Cross-linkable Acrylic Acid A | | | | | | | | | |
| Cross-linkable Acrylic Acid B | 0.8 | | | | | | | | |
| Cross-linkable Acrylic Acid C | | | | 8.0 | 0.7 | 0.9 | 0.7 | 0.7 | 0.7 |
| Cross-linkable Acrylic Acid D | | 0.8 | | | | | | | |
| Cross-linkable Acrylic Acid E | | | 0.8 | | | | | | |
| Ethylene Glycol | 20.0 | 20.0 | 20.0 | 20.0 | 10.0 | 10.0 | 10.0 | 20.0 | 20.0 |
| Propylene Glycol | | | | | | | | | |
| Glycerin | | | | | | | | | |
| Anti-sag Agent | | | | 0.5 | | | | | |
| Water-proofing Agent | | | | | | | | | |
| pH Modifier | 4.0 | 4.0 | 4.0 | 4.0 | 2.0 | 6.0 | 6.0 | 6.0 | 6.0 |
| Anti-corrosive Lubricant | 0.5 | 0.5 | 0.5 | 0.5 | 0.6 | 1.0 | 0.5 | 0.2 | 0.2 |
| Bacteriostat | 1.0 | 1.0 | 1.0 | 1.0 | 1.0 | 1.0 | 1.0 | 1.0 | 1.0 |
| Ion Exchange Water | Rest | Rest | Rest | Rest | Rest | Rest | Rest | Rest | Rest |
| Metal Ion Density in Ink (%) | ≦0.42 | ≦0.42 | ≦0.42 | ≦0.42 | ≦0.075 | ≦0.44 | ≦0.42 | ≦0.030 | ≦0.100 |
| Thixotropic properties | ○ | ○ | ○ | ○ | ○ | ○ | ○ | ⊙ | ○ |
| Sags and Runs | Δ | Δ | Δ | ⊙ | ○ | ○ | ○ | ○ | Δ |
| Ink Release Properties | ○ | ⊙ | ⊙ | ⊙ | ⊙ | ⊙ | ⊙ | Δ | ○ |
| Dry-up Resistance | ⊙ | ⊙ | ⊙ | ⊙ | ○ | ○ | ○ | ⊙ | Δ |
| Water Resistance | x | x | x | x | x | x | x | x | x |
| Ink Properties with Time | ○ | ○ | ○ | ○ | ○ | ○ | ○ | ○ | Δ |

Comparative Examples 1 through 12

The ink compositions were prepared as comparative examples in the same manner as described in Example 1 other than the proportions of ingredients being set forth in Table 3. The proportions of ingredients and the resulting properties are set forth in Table 3 below.

TABLE 3

| | Comparative Examples | | | | | | | | |
|---|---|---|---|---|---|---|---|---|---|
| | 1 | 2 | 3 | 4 | 5 | 6 | 7 | 8 | 9 |
| Direct Black 154 Metal Ion ≦ 1.0% | 7.5 | 7.5 | | 7.5 | 7.5 | | | | |
| Acid Black 154 Metal Ion ≦ 6.0% | | | 7.5 | | | | | | |
| Acid Red 90 Metal Ion ≦ 5.5% | | | | | | 8.0 | 8.0 | 8.0 | |
| Acid Red 94 Metal Ion 6.0% | | | | | | | | | |
| Acid Blue 90 Metal Ion ≦ 6.0% | | | | | | | | | 8.0 |
| Acid Blue 90 Metal Ion 7.0% | | | | | | | | | |
| Carbon Black | | | | | | | | | |
| Pigment Dispersing Agent | | | | | | | | | |
| Cross-linkable Acrylic Acid F | 0.7 | | | | | 0.9 | | | |
| Cross-linkable Acrylic Acid C | | | 0.7 | 0.4 | 1.2 | | | 0.9 | 0.9 |
| Cross-linkable Acrylic Acid G | | 0.7 | | | | | 0.9 | | |
| Ethylene Glycol | 20.0 | 20.0 | 20.0 | 20.0 | 20.0 | 20.0 | 20.0 | 5.0 | 20.0 |
| pH Modifier | 1.0 | 1.0 | 1.0 | 1.0 | 1.0 | 6.0 | 6.0 | 6.0 | 6.0 |
| Anti-corrosive Lubricant | 0.2 | 0.2 | 0.2 | 0.2 | 0.2 | 1.0 | 1.0 | 1.0 | 1.0 |
| Bacteriostat | 1.0 | 1.0 | 1.0 | 1.0 | 1.0 | 1.0 | 1.0 | 1.0 | 1.0 |
| Ion Exchange Water | Rest | Rest | Rest | Rest | Rest | Rest | Rest | Rest | Rest |
| Metal Ion Density in Ink (%) | ≦0.075 | ≦0.075 | 0.45 | ≦0.075 | ≦0.075 | ≦0.44 | ≦0.44 | ≦0.44 | ≦0.48 |
| Thixotropic properties | x | Turbid | x | x | Δ | x | Turbid | ○ | x |
| Sags and Runs | x | — | x | x | ○ | x | — | Δ | x |
| Ink Release Properties | Δ | — | ○ | ○ | x | Δ | — | ○ | ○ |
| Dry-up Resistance | ○ | — | ○ | ○ | ○ | ○ | — | x | ○ |

TABLE 3-continued

| Ink Properties with Time | ○ | — | ○ | ○ | Δ | ○ | — | ○ | ○ |
|---|---|---|---|---|---|---|---|---|---|
| | | | | | Comparative Examples | | | | |
| | 10 | 11 | 12 | 13 | 14 | 15 | 16 | 17 | |
| Direct Black 154 Metal Ion ≦ 1.0% | | | | 2.0 | 12.0 | 7.5 | | 35 | |
| Acid Black 154 Metal Ion ≦ 6.0% | | | | | | | | | |
| Acid Red 90 Metal Ion ≦ 5.5% | | | | | | | | | |
| Acid Red 94 Metal Ion 6.0% | | | | | | | | | |
| Acid Blue 90 Metal Ion ≦ 6.0% | 7.0 | 7.0 | | | | | | | |
| Acid Blue 90 Metal Ion 7.0% | | | 7.0 | | | | | | |
| Carbon Black | | | | | | | 9.0 | 2.0 | |
| Pigment Dispersing Agent | | | | | | | 1.0 | 0.5 | |
| Cross-linkable Acrylic Acid F | 0.8 | | | | | | | | |
| Cross-linkable Acrylic Acid C | | | 0.8 | 0.7 | 0.7 | 0.7 | 0.7 | 0.7 | |
| Cross-linkable Acrylic Acid G | | 0.8 | | | | | | | |
| Ethylene Glycol | 20.0 | 20.0 | 20.0 | 20.0 | 20.0 | 42.0 | 20.0 | 20.0 | |
| pH Modifier | 4.0 | 4.0 | 4.0 | 1.0 | 1.0 | 1.0 | 1.0 | 1.0 | |
| Anti-corrosive Lubricant | 0.5 | 0.5 | 0.5 | 0.2 | 0.2 | 0.2 | 0.5 | 0.5 | |
| Bacteriostat | 1.0 | 1.0 | 1.0 | 1.0 | 1.0 | 1.0 | 1.0 | 1.0 | |
| Ion Exchange Water | Rest | Rest | Rest | Rest | Rest | Rest | Rest | Rest | |
| Metal Ion Density in Ink (%) | ≦0.42 | ≦0.42 | 0.49 | ≦0.02 | ≦0.12 | ≦0.075 | 0.35 | 0.20 | |
| Thixotropic properties | x | Turbid | x | ○ | x | x | Δ | Δ | |
| Sags and Runs | x | — | x | x | ○ | x | ○ | Δ | |
| Ink Release Properties | Δ | — | ○ | x | x | x | x | x | |
| Dry-up Resistance | ○ | — | ○ | ○ | x | ○ | x | x | |
| Ink Properties with Time | ○ | — | ○ | ○ | x | ○ | x | x | |

As stated above, pigments have no ability to be redissolved, so that it is difficult to achieve high time-stability of its dispersions. Ink compositions containing a pigment are thus degraded in functions, as compared with those ink containing dyes. Further, pigments create a defect causing wear of the rolling ball located at a pen point, thereby reducing the writing life of a pen. See Comparative Examples 16 and 17.

The ink composition according to the present invention can be directly filled in a pen body without using an absorbent ink reservoir and an ink feed rod. Such direct filling results in the increased ink holding capacity of a ball-point pen. In addition, the ink composition has high time-stability, high dry-up resistance and good ink release properties while having no spinnability, tackiness tendency and possibilities of drips and runs from a pen-point. Good ink release properties may reduce undesired wear of the pen body.

What is claimed is:

1. A water base ink composition for directly feeding to a pen body of a ball-point pen comprising a dye in the range of 3% to 10%, by weight as the sole colorant; humectant in the range of 10% to 40%, by weight; thixotropic agent in the range of 0.6% to 1.0%, by weight, said thixotropic agent being composed of a cross-linkable acrylic acid polymer having a number average molecular weight ranging from 2,000,000 to 6,000,000; and water as the balance, wherein said ink has a metal ion concentration of 0.075% to less than 0.45%.

2. The water base ink composition as claimed in claim 1 further comprising a anti-drip agent in the range of 0.3% to 0.5%, by weight.

3. The water base ink composition as claimed in claim 1 further comprising anti-corrosive lubricant in the range of 0.2% to 2%, by weight.

4. The water base ink composition as claimed in claim 1 further comprising a water-proofing agent in the range of 0.5% to 5%, by weight.

5. The water base ink composition as claimed in claim 1 further comprising a pH modifier in the range of 1% to 6%, by weight.

6. The water base ink composition as claimed in claim 1 further comprising a bacteriostat in the range of 1% to 2%, by weight.

7. The water base ink composition as claimed in claim 1, wherein said humectant is selected from the group consisting of dihydric alcohol, trihydric alcohol.

8. The water base ink composition as claimed in claim 1, wherein said humectant is selected from the group consisting of ethylene glycol and polyethylene glycol.

9. The water base ink composition as claimed in claim 1, wherein said anti-drip agent is a water-soluble resin having film-forming properties.

10. The water base ink composition as claimed in claim 1, wherein said anti-drip agent is a copolymer of polyethylene and polyethylene glycol.

11. The water base ink composition as claimed in claim 1, wherein said anti-corrosive lubricant is selected from the group consisting of phosphate surfactants, benzotriazole and fatty acid esters.

12. The water base ink composition as claimed in claim 1, wherein said water-proofing agent is selected from the group consisting of polyethyleneimine and polyallylamine.

13. The water base ink composition as claimed in claim 1, wherein said pH modifier is triethanolamine.

14. The water base ink composition as claimed in claim 1 which has a thixotropic behavior such that when the ink is at rest it is a gel and when subject to shear said ink becomes a liquid.

* * * * *